(12) United States Patent
Biamonte

(10) Patent No.: US 7,327,046 B2
(45) Date of Patent: Feb. 5, 2008

(54) KINETIC ENERGY SYSTEM AND APPARATUS FOR CHARGING PORTABLE BATTERIES

(76) Inventor: Alexander Benjamin Biamonte, 152 B Segar Mountain Rd., Kent, CT (US) 06757

( * ) Notice: Subject to any disclaimer, the term of this patent is extended or adjusted under 35 U.S.C. 154(b) by 0 days.

(21) Appl. No.: 11/318,185

(22) Filed: Dec. 23, 2005

(65) Prior Publication Data
US 2007/0145746 A1    Jun. 28, 2007

(51) Int. Cl.
    *H02P 9/04* (2006.01)
(52) U.S. Cl. .................. 290/1 R; 290/1 A; 322/1; 322/3
(58) Field of Classification Search .......... 290/1 R, 290/1 A, 8, 50; 322/1, 3
See application file for complete search history.

(56) References Cited

U.S. PATENT DOCUMENTS

| | | | | |
|---|---|---|---|---|
| 4,782,602 A | * | 11/1988 | Lakic | 36/2.6 |
| 4,837,494 A | * | 6/1989 | Maier | 322/1 |
| 4,845,338 A | * | 7/1989 | Lakic | 219/211 |
| 5,358,461 A | * | 10/1994 | Bailey, Jr. | 482/2 |
| 5,495,682 A | * | 3/1996 | Chen | 36/2.6 |
| 6,239,501 B1 | * | 5/2001 | Komarechka | 290/1 R |
| 6,255,799 B1 | * | 7/2001 | Le et al. | 320/107 |
| 6,281,594 B1 | * | 8/2001 | Sarich | 290/1 R |
| 6,744,145 B2 | * | 6/2004 | Chang | 290/1 R |
| 6,812,583 B2 | * | 11/2004 | Cheung et al. | 290/1 R |

* cited by examiner

*Primary Examiner*—Nicholas Ponomarenko
(74) *Attorney, Agent, or Firm*—Hosmer & Reiter; Howard S. Reiter

(57) ABSTRACT

A linear electric generator is mounted to an article of human clothing that is subject to repetitive fore-and-aft motion when worn by a human wearer during locomotion. The linear axis of the generator is aligned generally parallel to the direction of fore-and-aft motion of the wearer to utilize the kinetic locomotion energy of the wearer for production of electricity. A separable electric connector is coupled to the output of the generator to facilitate electrical connection to a battery for charging purposes.

7 Claims, 3 Drawing Sheets

KINETIC ENERGY SYSTEM AND APPARATUS FOR CHARGING PORTABLE BATTERIES

BACKGROUND OF THE INVENTION

This invention relates generally to portable electrical energy sources, and more specifically relates to the use of such sources for charging and maintaining the charge of portable rechargeable batteries of the type now widely carried by individuals to provide power for portable electronic devices such as games, cell-phones, health maintenance devices and the like.

Various arrangements and apparatus for charging small portable batteries are well known in the art and have been in general use for many years. The types of battery chargers that have been in general use for this purpose customarily obtain electrical energy from household or industrial sources such as wall receptacles and heavy-duty power generators powered by solid or liquid fuels. Other types of battery chargers use relatively large stored-energy sources such as automobile batteries that are coupled to the smaller batteries through automotive electrical connectors (for example, "cigarette-fighter-type" receptacles). Some experimental applications have used small linear-motion generators carried by various kinds of wildlife to power animal telemetry devices, using energy derived from the random movement of the animal.

BRIEF SUMMARY OF THE INVENTION

Prior to this invention, the art is not known to have disclosed or suggested mounting an electrical generator device on an article of human clothing in a way that utilizes conveniently the repetitive fore-and aft motion of the wearer's activities to generate sufficient electricity for charging or maintaining the electrical charge in small portable batteries. Specifically, the embodiment of the invention herein disclosed incorporates a linear-motion electrical generator mounted to the body of an otherwise generally conventional shoe of any conventional variety, in overall alignment with the longitudinal axis of the shoe, and provides for electrical coupling of the generator output to a rechargeable battery. Through this assembly, the excess kinetic energy produced by the ordinary to-and-fro motion of walking causes repetitive fore-and-aft displacement of the generator magnet relative to the generator coils, to produce sufficient electric energy to charge and/or maintain the charge of a portable battery carried by the wearer.

Although the embodiment herein set forth discloses the use of a shoe as a specific article of clothing, other clothing articles, for example gloves or pants legs, that are subject to repetitive to-and-fro motion during ordinary human locomotion such as walking, running, jogging, etc, may embody this invention without departing substantially from the spirit and scope of the invention. Such locomotion typically generates available kinetic energy which this invention harnesses in a previously unconsidered manner. In this regard, ordinary human locomotion characteristically involves repetitive to-and-fro motion, generally parallel to the ground, of parts of the human body that are most often clothed, such as hands, arms, legs, and feet. This invention discloses the concept of utilizing the motion of the clothing covering these body parts to generate electricity for charging portable electrical batteries.

That is, in accordance with the disclosed embodiment of this invention, a lightweight, portable electrical generator of the well-known linear-motion type is mounted to a wearable shoe of any suitable kind in generally parallel alignment with the axis of the shoe, and a power take-off apparatus electrically coupled to the generator is available to deliver the output of the generator to a portable battery carried by the wearer. A wearer may carry the battery in various convenient manners, as for example, on a conventional belt clip or simply in a pocket. It will now be understood readily by those skilled in this art that the power take-off apparatus coupling the generator output to the rechargeable battery may be as simple as a suitable length of conductive cable extending from the generator output and terminating in a separable electrical connector suitable for electrically engaging the input/output terminals of the battery.

These and other objects, features and advantages of the invention will be made apparent to those having skill in the related art, by reference to the following specification considered in conjunction with the accompanying drawings, in which:

DETAILED DESCRIPTION OF THE INVENTION

Figure 1:
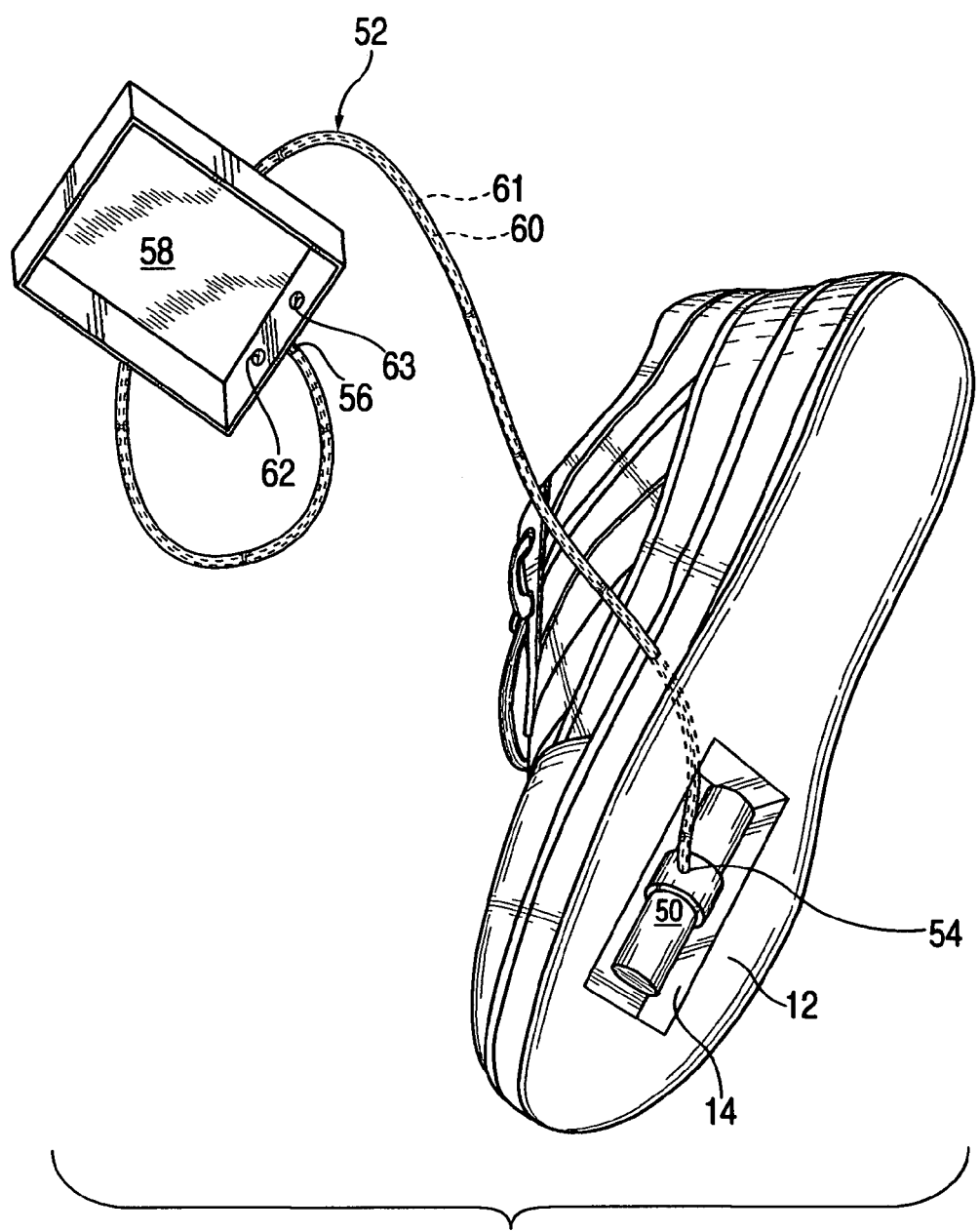
FIG. 1 is an illustrative partially cut-away pictorial representation of a shoe embodying this invention.

Referring now to FIG. 1 of the drawings, the illustrated embodiment of this invention may be seen to comprise a shoe [10] having a linear-motion electrical generator [50] mounted in the sole [12] of the shoe. An electrically conductive cable [52] has one end [54] coupled to the generator [50], for coupling the electrical output of the generator to a separable electrical connector [58] mounted at the other end [56] of the cable [52]. Linear generators are well-known in the art and such generators, having the capacity to charge/ and or maintain the electrical charge in a n electrical energy-storage device such as a battery or a capacitive storage circuit, are widely available. So-called "shake-and-light" portable flash lights are representative of currently available consumer products embodying linear motion generators. In such flashlights, an LED light source is energized by a capacitive storage circuit which in turn is charged electrically by vigorous fore-and-aft shaking of the flashlight body that incorporates a suitably sized liner-motion generator. Because such generators are now well known in the art, details of their structure are not set forth herein except to point out that the electrical output of the generator [50] is commonly coupled to one end of a flexible output cable [52] commonly comprising at least a pair of electrical conductors [60, 61].

In accordance with this invention, a separable electrical connector [58] is coupled to the terminal end [56] of cable [52] for delivering the electrical output of generator [50] to the input/output battery terminals [64, 65] of a rechargeable battery [66] through connector contacts [62, 63].

Suitable electrical connectors for use in this invention are well known and widely available and, accordingly, extensive details are not set forth herein. However, applicant points out that suitable electrical connectors for use with this invention may assume various forms such as the well known type of battery receptacle [58] illustrated in FIGS. 1 and 2, or the separable electrical connector half [158] illustrated in FIG. 3. It will be understood readily by those skilled in these arts, that connector half [158] is a well-known and widely used type of electrical connector adapted to separably engage and electrically connect to a mating connector half of the type incorporated in many different types of electrical utilization devices that provide the mating half for the purpose of providing input to the device itself as well as for providing input to portable batteries incorporated in such devices. Correspondingly, battery receptacle connectors such as connector 58 in FIGS. 1 and 2, directly receive a battery [66], and provide contacts [62, 63] for electrically engaging the battery terminals [64, 65]

The technology of rechargeable batteries [66], and devices (not shown) incorporating such batteries, such as hand-held electronic games, cell phones and the like, are too well-known and widely used at this time to require any further descriptive explication herein.

It will be understood readily that electrical generator [50] has an electrical output which may be connected in many ways to any form of utilization device. In this regard, FIG. 1 illustrates a separable electrical connector in the form of a battery receptacle [58] at the end of flexible cable [52] as one form of electrical output connector. Those skilled in the related arts will recognize readily that various forms of electrical output connectors may be used within the scope of this invention. By way of example only, if it is desired to couple this invention to an electrical device of any other [not shown] type, having an integral battery which is powered or recharged via a standard electrical battery input/output receptacle having contact terminals that serve the purpose of contacts [62, 63] shown in FIG. 2, the separable electrical connector [58] at the end of cable [52] may be a standard separable "male/female" input connector [158] as shown in FIG. 3 or a battery receptacle [58], as shown in FIG. 1 or any other suitable form of separable electrical connector half.

Further referring to the embodiment of the invention illustrated in FIG. 1, the sole [12] of any acceptable form of shoe [10] is configured to serve both as a conventional shoe sole and to incorporate a receptacle volume or space or recess [14] for enclosing the linear generator [50]. Receptacle space [14] may be formed in any convenient manner, for example by molding or cutting away of material. Enclosure of the generator [50] within the receptacle space [14] in the body of the shoe sole [12] similarly may be achieved in any known manner such as by molding in place or by sealing of the space [14] after the generator [50] has been positioned within the space [14]. Provision for guiding output cable [52] from generator [50] within the body of sole [12] to the exterior of the sole, also may be achieved in any desired manner and the cable then may then be guided in any convenient way to a suitable and desired location on the body of the wearer of the shoe [10] where the connector [58] at the terminal end [56] of cable [52] may then be made available for coupling to a battery [66].

Figure 2:
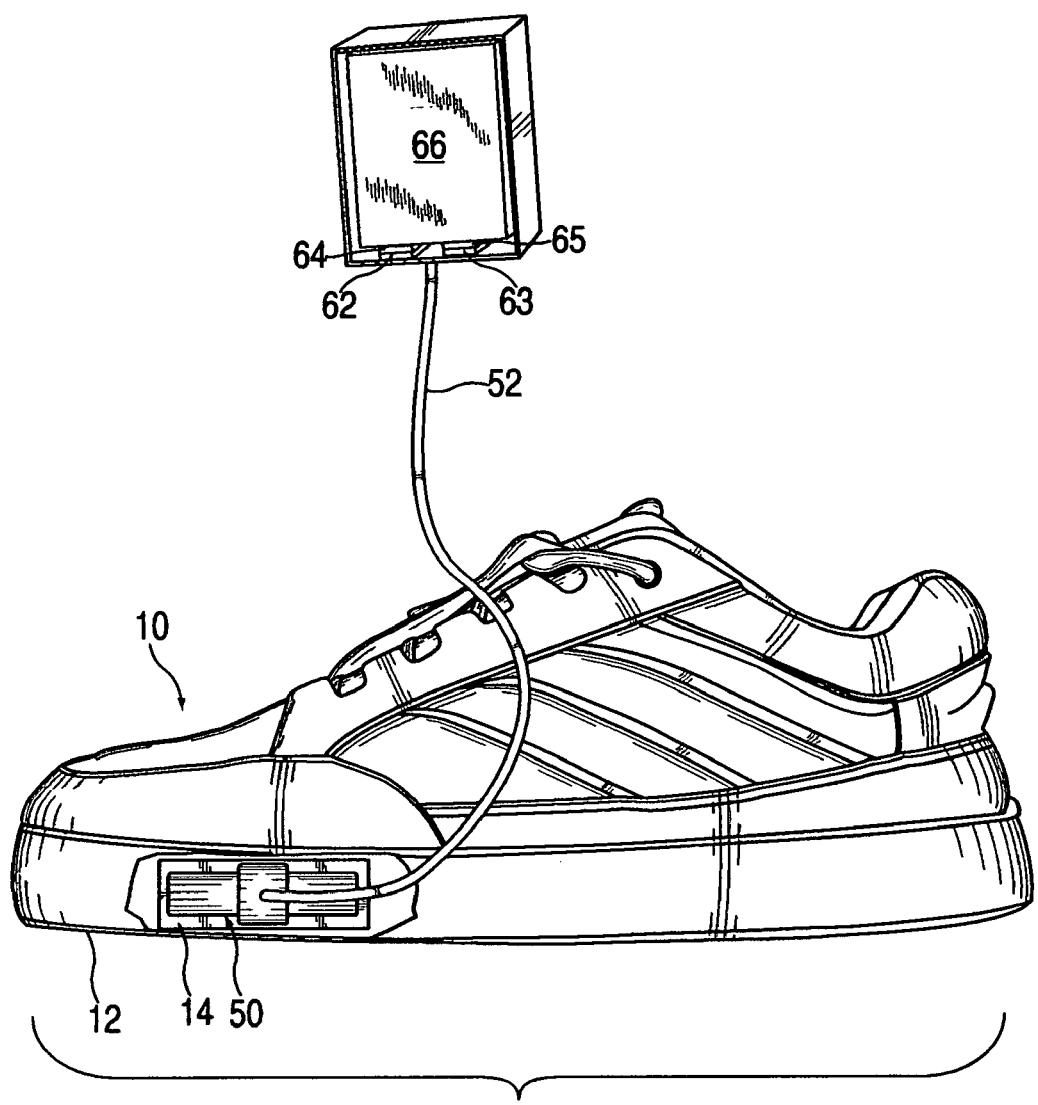
FIG. 2 is a sectional elevation view of the shoe of FIG. 1, with a cutaway portion shown in place.
Figure 3:
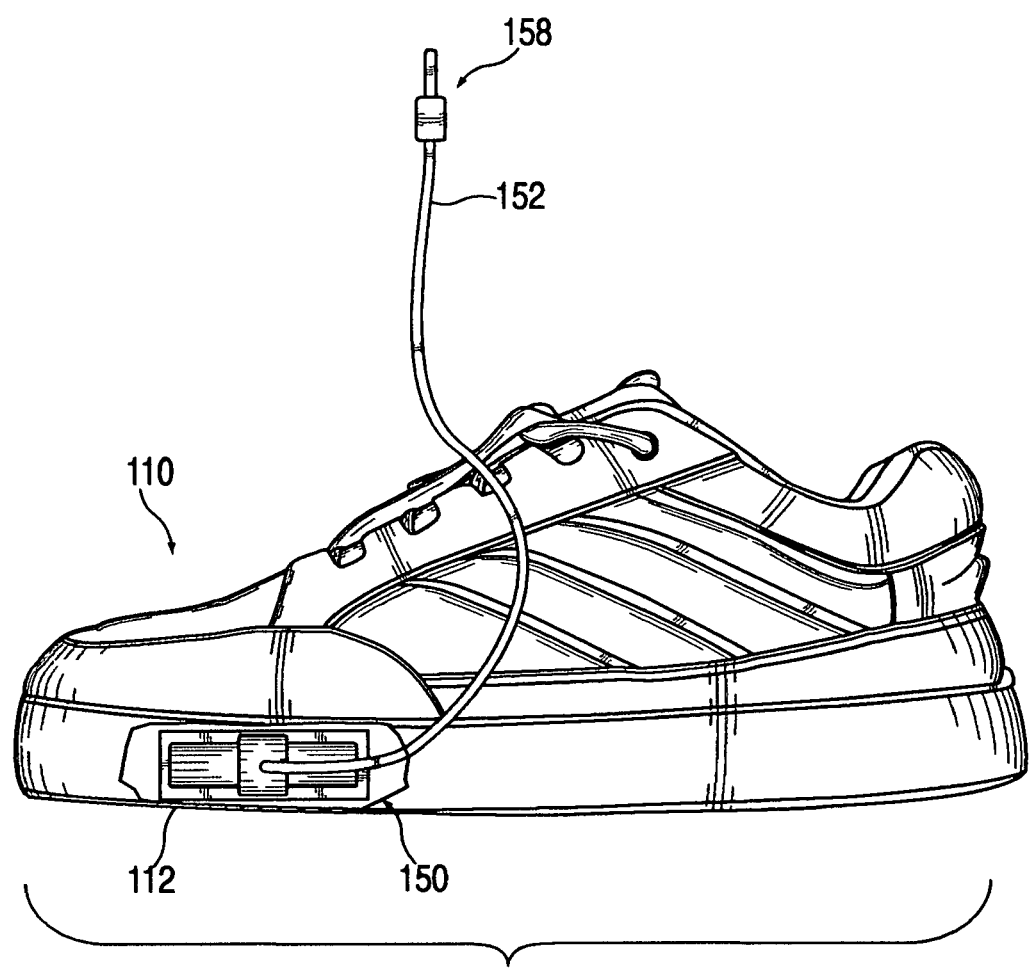
FIG. 3 is a sectional elevation view of a somewhat modified embodiment of the shoe of FIG. 2.

Referring more specifically to the somewhat different embodiment of the invention illustrated in FIG. 3 of the drawings, it should be pointed out for convenience that elements corresponding generally to the parts shown in FIGS. 1 and 2 have been numbered correspondingly with the numeral 1 inserted ahead of each reference numeral used in FIGS. 1 and 2. In this FIG. 3, a linear generator [150] may be seen to be embedded entirely within the body of sole [112] of shoe [110] as by molding it in place by any well-known technique while the sole is being formed. Electrical cable [152] may be molded in place similarly, partially within the body of sole [112] and partially external thereto. The choice of either encasing a suitable linear generator within a recess receptacle or space [14] or molding or embedding it in place as suggested in FIG. 3 is believed to be a matter of choice to be determined by the nature of the materials and structure being used for either or both of the sole and the generator.

Although a preferred embodiment of the invention has been illustrated and described, those having skill in this art will recognize that various other forms and embodiments of the invention now may be visualized readily without departing significantly from the spirit and scope of the invention disclosed herein and set forth in the accompanying claims.

What is claimed is:

1. A portable kinetic energy apparatus for generating electrical power to charge portable rechargeable batteries, said apparatus comprising:
    an article of human clothing customarily worn on a body part of a human wearer that is characterized by repetitive fore-and-aft motion substantially parallel to a given locomotion axis during ordinary locomotion activity of said wearer;
    a linear-motion electrical generator mounted on said article of clothing; aligned substantially parallel to the locomotion axis of said fore-and-aft motion, said electrical generator having an electrical output;
    an electrical output connector coupled to said electrical output of said generator and extending therefrom for coupling said electrical output of said generator to a rechargeable battery.

2. A portable kinetic energy apparatus in accordance with claim 1, wherein:
    said electrical output connector comprises an electrical cable connected to the electrical output of said generator at one end thereof and having a separable electrical connector coupled to the other end thereof for electrically engaging and connecting to a portable battery.

3. A portable kinetic energy apparatus in accordance with claim 2, wherein:
    said separable electrical connector is a battery receptacle for separably receiving a battery and engaging the terminals thereof.

4. A portable kinetic energy apparatus in accordance with claim 2, wherein:
    said separable electrical connector is an electrical connector half for separably engaging and connecting to a mating connector half in any electrical device having a such mating connector half.

5. A portable kinetic energy apparatus in accordance with claim 2, wherein:
    said article of clothing is a shoe.

6. A portable kinetic energy apparatus in accordance with claim 3, wherein:
    said linear-motion electrical generator is enclosed within a space in the sole of said shoe.

7. A portable kinetic energy apparatus in accordance with claim 4, wherein:
    said linear-motion electrical generator is embedded in the material forming the sole of said shoe.

* * * * *